United States Patent [19]

Pretz

[11] Patent Number: 6,014,658

[45] Date of Patent: Jan. 11, 2000

[54] USING A DATABASE FOR MANAGING SOLUTIONS TO PROBLEMS

[75] Inventor: Jeffrey L. Pretz, Nampa, Id.

[73] Assignee: Micron Electronics, Inc., Nampa, Id.

[21] Appl. No.: 08/982,084

[22] Filed: Dec. 1, 1997

[51] Int. Cl.[7] .................................................. G06F 17/30

[52] U.S. Cl. ...................... 707/2; 707/1; 707/3; 707/10

[58] Field of Search .................... 707/2, 10, 104; 395/200.59; 348/2; 706/11, 47, 59, 60; 364/238; 705/1, 26; 399/16

[56] References Cited

U.S. PATENT DOCUMENTS

| | | | |
|---|---|---|---|
| 4,881,230 | 11/1989 | Clark et al. | 354/238 |
| 5,010,551 | 4/1991 | Goldsmith et al. | 399/16 |
| 5,715,374 | 2/1998 | Heckerman et al. | 706/46 |
| 5,720,001 | 2/1998 | Nguyen | 706/59 |
| 5,771,354 | 6/1998 | Crawford | 395/200.59 |
| 5,784,539 | 7/1998 | Lenz | 395/50 |
| 5,802,493 | 9/1998 | Sheflott et al. | 705/1 |
| 5,802,504 | 9/1998 | Suda et al. | 706/11 |
| 5,884,045 | 3/1999 | Kurihara | 705/26 |
| 5,903,642 | 5/1999 | Schwartz et al. | 379/309 |
| 5,915,010 | 6/1999 | McCalmont | 379/212 |
| 5,918,207 | 6/1999 | McGovern et al. | 705/1 |

*Primary Examiner*—Paul R. Lintz
*Assistant Examiner*—Ella Colbert
*Attorney, Agent, or Firm*—Trop, Pruner, Hu & Miles, P.C.

[57] ABSTRACT

The invention, in one embodiment, is method for managing solutions to problems. The method includes accessing a first store containing at least one issue and at least one pre-existing solution associated with the issue; and importing the first store into a second store, the second store being remote from the first store.

21 Claims, 13 Drawing Sheets

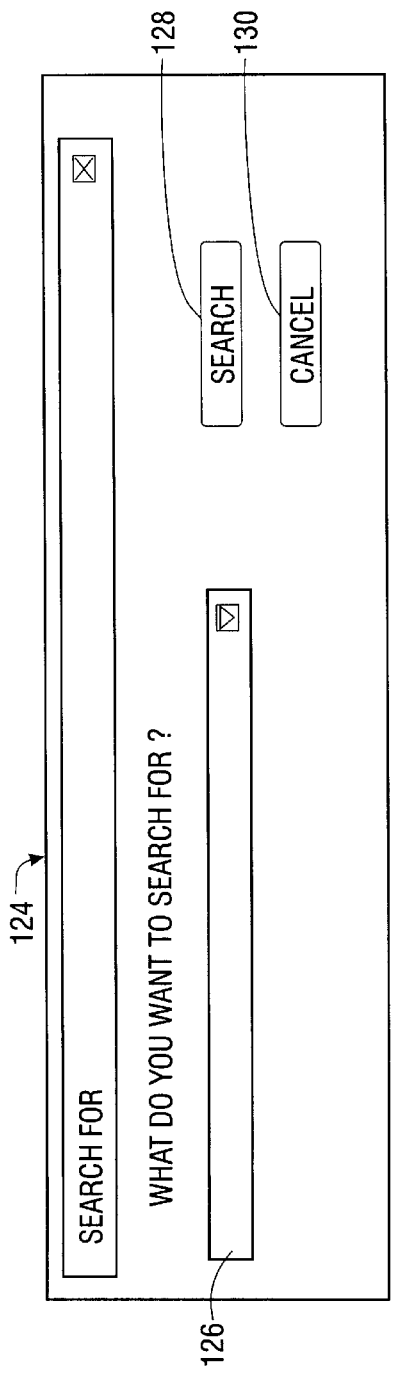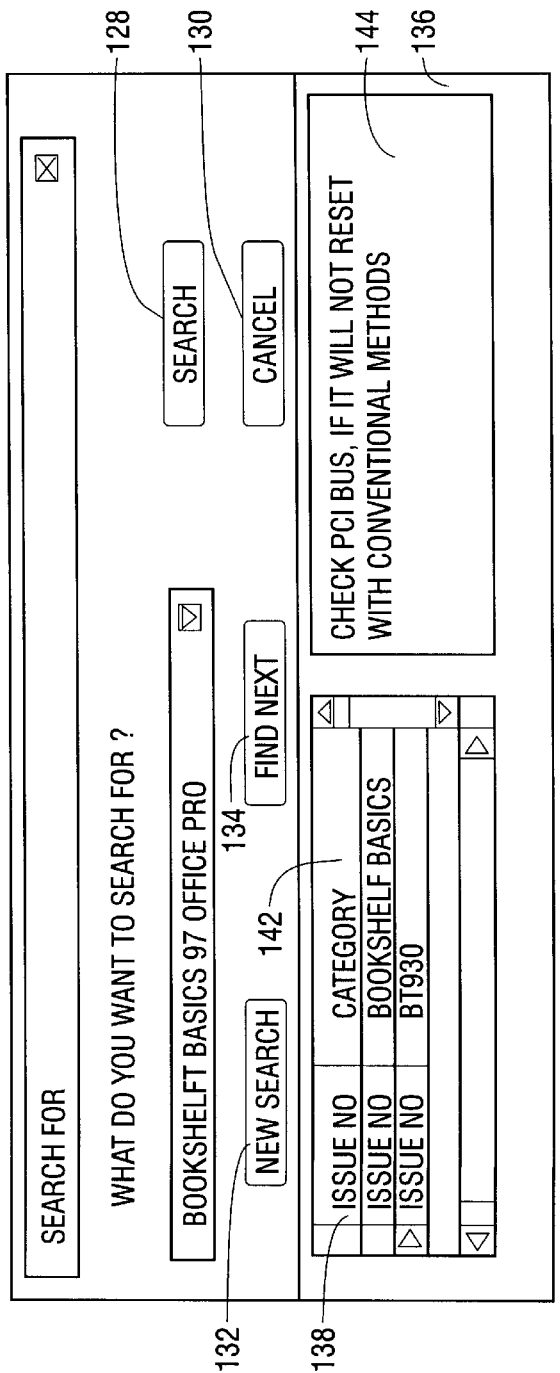

USING A DATABASE FOR MANAGING SOLUTIONS TO PROBLEMS

BACKGROUND OF THE INVENTION

1. Field of the Invention

The present invention relates generally to an automated method and apparatus for solving problems and, more particularly, to an automated method and apparatus for managing preexisting and original solutions to a current issue.

2. Description of Related Art

The demand for and complexity of computer hardware and software has continued to skyrocket. One factor fueling the demand for computers is the expansion of the personal computer market into the individual consumer market. Many of these individuals are unfamiliar with computers and have many questions on how to set-up and maintain their equipment.

Personal computer manufacturers and vendors frequently provide technical assistance to their customers to answer such questions. Thus, along with the demand for computers, an even larger demand has developed for technical service representatives working for the manufacturers and vendors of the computers and software. Furthermore, technical service representatives are finding it harder every day to service their callers looking for helpful advice.

Technical service representatives currently follow several procedures when a difficult problem arises. Some of these include: searching the Internet and Microsoft Teknek, using existing technical tips via e-mail, and questioning neighboring technical service representatives and supervisors. However, to prevent each technical service representative from "reinventing the wheel" when a similar question is encountered, the general approach is for a database or written record to be created which stores the problem and the solution. Currently, there are at least two ways to implement the written record/database approach.

The first approach involves each technical service representative dutifully tracking each problem with an on-line, centralized database. Such databases, however, are not designed for reference purposes although some technical service representatives reference their contents. Instead, the databases are designed to log the problems for statistical purposes in analyzing problem areas with the computer hardware and/or software. This method requires network system resources to run on-line database programs which can slow down the technical service representative's station. This process also requires each technical service representative to develop the database, thereby taking time from the technical service representative, particularly if the technical service representative is unfamiliar with how to use the database software. The centralized database also is not necessarily useful to the technical service representative. For instance, the centralized database is rarely ever customized for any particular technical service representative.

The second method is to write out a problem explanation on a notebook. This poses some obvious problems such as keeping track of where a particular problem is written down, how to organize them, and the prevention of the information being lost. In addition, this process takes more time than simply typing in an issue. Thus, while this method typically generates a reservoir of information customized to a particular customer service representatives needs, it is typically cumbersome, inefficient, and incomplete.

The present invention is directed to overcoming, or at least reducing the effects of, one or more of the problems set forth above.

SUMMARY OF THE INVENTION

The invention, in one embodiment, is a method for managing solutions to problems. The method includes accessing a first store containing at least one issue and at least one pre-existing solution associated with the issue, and importing the first store into a second store, the second store being remote from the first store.

BRIEF DESCRIPTION OF THE DRAWINGS

FIGS. 12 and 13 illustrate the dialog boxes associated with the "Search" graphic object of FIG. 8, before and after a result to the search is found, respectively.

Figure 1:
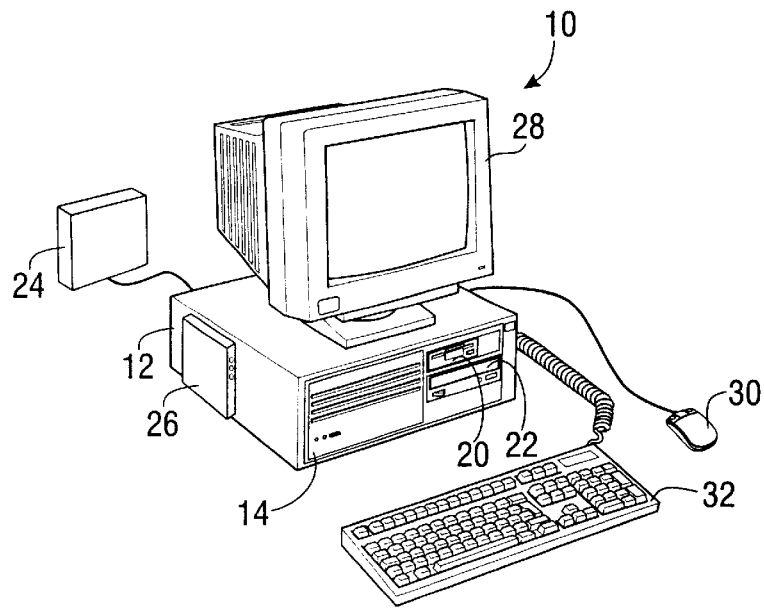
FIG. 1 is a block diagram of a personal computer suitable for use in implementing the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will be appreciated that in the development of any actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

An Apparatus for Practicing the Invention

FIG. 1 illustrates a personal computer 10 suitable for implementing the present invention. The personal computer 10 may be a desktop computer manufactured and sold by Micron Electronics Inc., located in Nampa, Id. However, the invention is not so limited as other types of computers, such as laptop computers, might also be employed. Similarly, computers made by other manufacturers might also be used.

The personal computer 10 in the embodiment illustrated includes a processor chassis 12 in which are disposed a motherboard and a variety of other circuit boards, neither of which is separately shown. The personal computer 10 also provides a program storage device, such as the disk (not shown) of a hard disk drive 14. The disk of the hard disk drive 14 may be used to store the software implementing the method in its various embodiments disclosed below. Alternatively, the software may be stored on other program storage devices such as the floppy disk inserted into a floppy disk drive 20 or an optical disk inserted into the optical disk drive 22.

Referring again to FIG. 1, a network server 24 and a modem 26 may be conventionally implemented in some embodiments for conventional networking operations. Further, a display 28, a mouse 30, and a keyboard 32 assist the user when interacting with the software implementing the invention and a database stored in the personal computer 10, examples of which will be described below. The present invention, in some embodiments, may be implemented with or without the network server 24 and the modem 26. The personal computer 10, through the network server 24 and/or the modem 26 may access through a local area network ("LAN") 38 or a wide area network ("WAN") 40, both shown in FIG 2.

Figure 2:
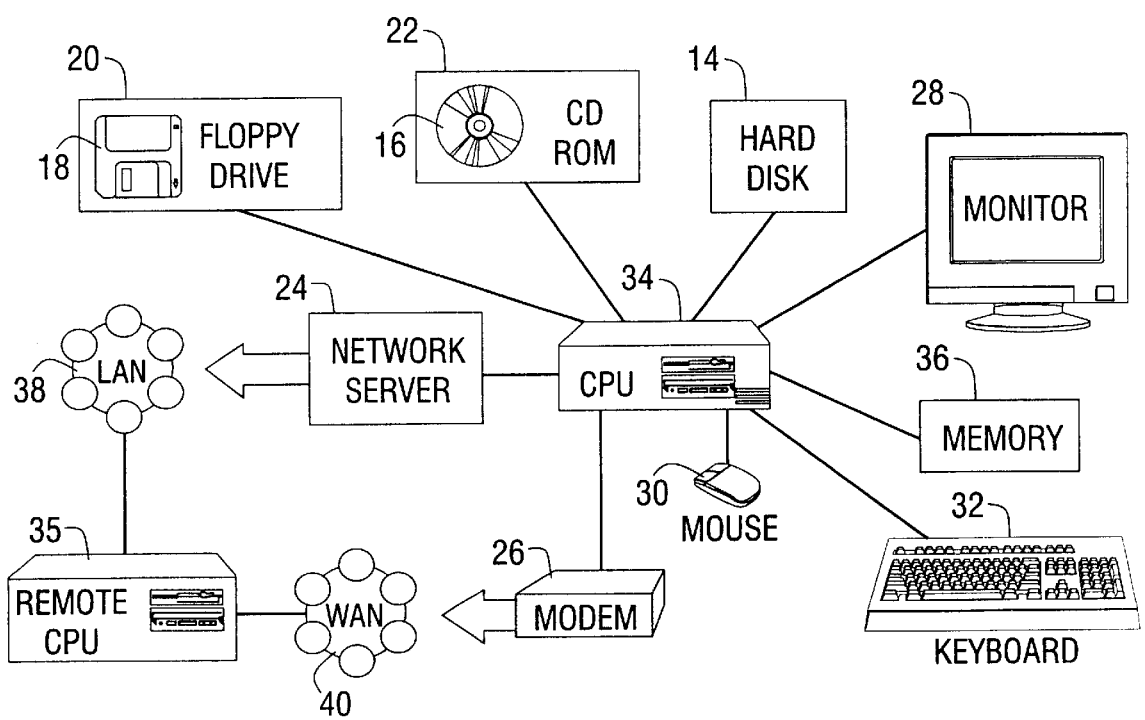
FIG. 2 is a block diagram showing some of the components of the processor chassis in the personal computer of FIG. 1.

FIG. 2 conceptually illustrates the computer 10 and some of its various components, including a central processing unit ("CPU") 34 and a memory 36. The memory 36 may include both read-only memory ("ROM") and random access memory ("RAM") coupled to the CPU 34. Also coupled to the CPU 34 are the display 28, the floppy disk drive 20, the optical disk drive 22, the hard disk drive 14, the mouse 30, and the keyboard 32. All of these components can be implemented in a conventional manner. In alternative embodiments including the network 24 and the modem 26, the resultant networked system will allow each CPU 34 to interact with multiple remote computers 35 through the LAN 38 or WAN 40.

Some portions of the detailed descriptions below are presented in terms of software implemented methods or algorithms, and/or symbolic representations of operations on data bits within a computer memory. These descriptions and representations are the means by which those skilled in the art most effectively convey the substance of their work to others skilled in the art. A software implemented method and/or algorithm is here, and is generally, conceived to be a self-consistent sequence of acts leading to a desired result. The acts require at some level physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, all of these and similar terms are to be associated with the appropriate physical quantities and are merely convenient labels applied to these quantities. Unless specifically stated or as may otherwise be apparent from the above discussions, terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A First Embodiment of the Invention

Figure 3A:
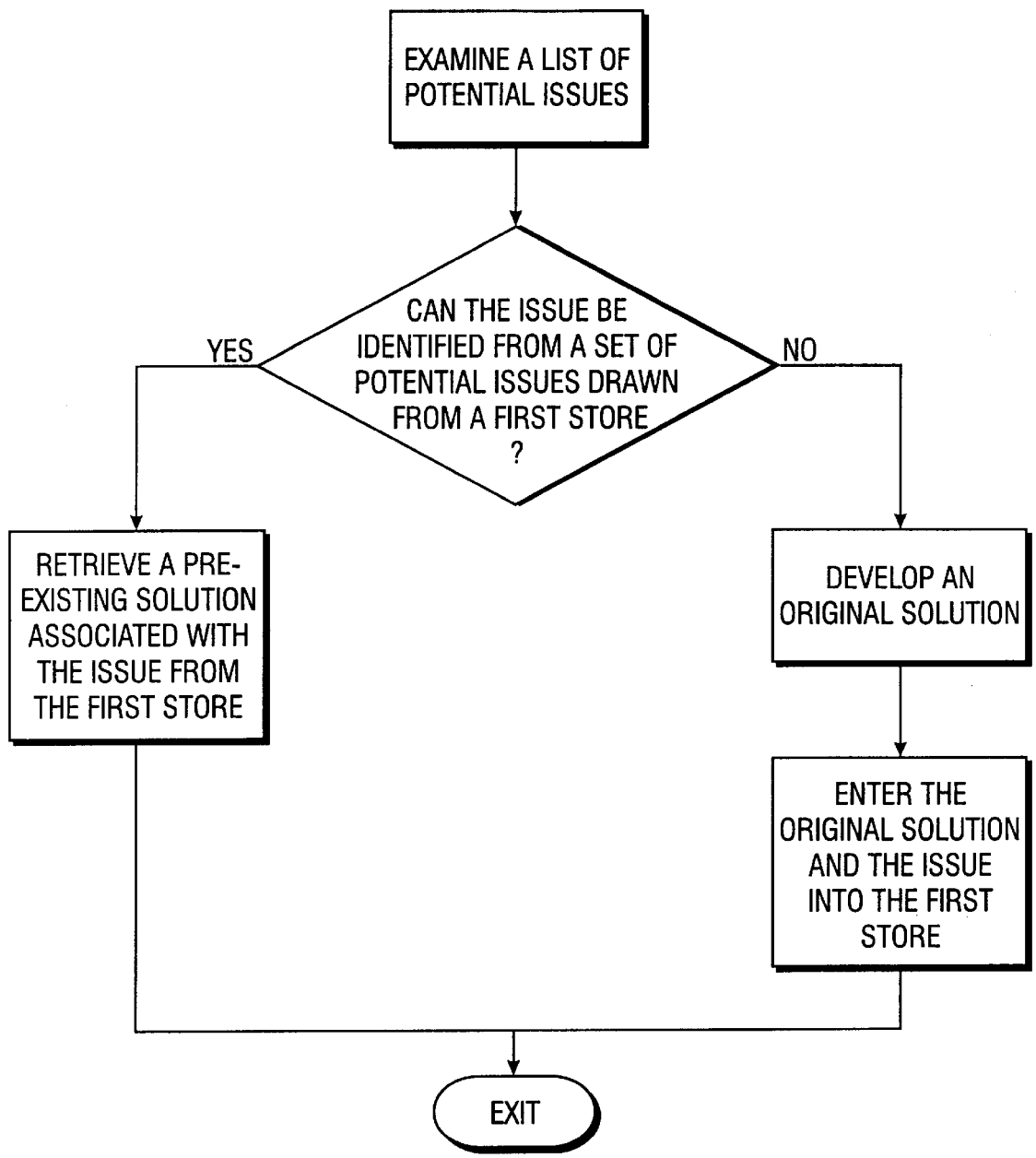
FIGS. 3A and 3B illustrate two aspects of the present invention in accordance with one embodiment thereof.
Figure 3B:

FIGS. 3A and 3B illustrate a first embodiment of the invention. This particular embodiment is a method for managing solutions to problems. Problems are presented as issues for which pre-existing or original solutions are found. An "issue" may be virtually any difficulty a customer brings to a customer service representative for resolution but for which the customer service representative does not have a ready solution. An "issue" may also be a difficulty brought to a customer service representative's attention, the solution for which the customer service representative thinks most customer service representatives will be unaware. A "solution" is a description of actions that may be taken to address, and hopefully resolve, the problem, or "issue." This particular embodiment, in different aspects of the invention, generally comprises generating a first store of issues and pre-existing solutions as illustrated in FIG. 3A and importing a second store of issues and pre-existing solutions as illustrated in FIG. 3B.

This particular embodiment, as shown in FIG. 3A, generally comprises first examining a list of potential issues drawn from a first store of information. If the issue can be identified from the list of potential issues, a pre-existing solution associated with the issue is retrieved from a second store. If the issue cannot be identified from the list of potential issues, then the user develops an original solution to the problem and enters the original solution and the issue to the first store.

Note that, in some embodiments, individual issues may be grouped and processed as a "category" of related potential issues. Still referring to FIG. 3A, in such embodiments, the user might scan a list of categories of potential issues before retrieving the pre-existing solutions associated with the issues comprising the category from which the user may select. As used herein, the term "issues" shall also be understood to encompass categories of related issues that are grouped to facilitate the implementation of some embodiments unless otherwise apparent from the context. For instance, the term "individual issues" may be used to establish a context in which the term "issues" does not necessarily encompass categories.

The act of retrieving a pre-existing solution may, in some embodiments, include, searching the store to sequentially examine a plurality of pre-existing solutions associated with a category, and selecting the solution that is retrieved from among the plurality of pre-existing solutions. In such an embodiment, the pre-existing solutions must also be associated with the categories. Where the issue is a category, a plurality of pre-existing solutions may be associated with a single category even though not all pre-existing solutions may be desirable. The pre-existing solutions must therefore each be examined to see if it should be retrieved. Because the plurality of pre-existing solutions is examined sequentially, the user may have to examine only the first solution. On the other hand, the user may also have to examine every solution in the store.

The method of FIG. 3A will frequently be performed by a person who is not personally confronting the issue, but is rather assisting a third party who is. In a frequently employed embodiment, the user will be a technical service representative assisting a third party who has purchased computer hardware or software from the technical service representative's employer, although the invention is not so limited. Thus, in some embodiments, the user will communicate the solution to a third party and this communication can be done in many ways. Typically, the communication is either oral or through electronic mail.

The list of potential issues is typically also stored in a separate store although this is not necessary to the practice of the invention. For instance, the list could simply be maintained in a text file for display. Wherein the list of possible solutions is maintained in a separate database, the separate database may be linked to the database in which the solution associated with the issue is stored. The separate database may also include the respective category to which each potential issue is classed. Embodiments employing such a separate database may provide for the database to order or sort in a number of ways, including by frequency of retrieval, category, and latency between retrievals.

FIG. 3B illustrates a first aspect of the invention as manifested in the second embodiment of the invention. More particularly, using the software implementing the present invention, the customer service representative first accesses a second store containing at least one issue and at least one pre-existing solution associated with the issue, the second store being remote from the first and then imports the second store into the first store.

The term "remote" means that the second store is located and must be accessed on a computer other than the one being used by the customer service representative. For example, referring to FIG. 2, the second store may be stored in some form of program storage device associated with a remote CPU 35 accessed over the LAN 38 or the WAN 40 although this is not necessary to the practice of the invention. In the event that the second store is accessed over a LAN such as the LAN 38 in FIG. 2, then access may be through a network server 24 or over a personal link directly mapped to the remote CPU 35.

Each of the first and second stores of information is a data structure encoded on some kind of program storage device. The manner in which the first and second stores are implemented will vary depending upon the particular embodiment. For instance, the first and second stores may be implemented as:

(a) a database including a plurality of records, each record containing an issue and at least one pre-existing solution to the issue;

(b) a first database including a plurality of pre-existing solutions and a second database including a plurality of solutions, each of the plurality of solutions being associated with at least one of the plurality of issues.

(c) a linked list of issues and a linked list of pre-existing solutions, each one of the pre-existing solutions also being linked to at least one of the issues;

(d) a list of pre-existing solutions and a file containing at least one issue and a pointer associated with the at least one issue, the pointer pointing to a particular preexisting solution.

Thus, the manner in which any particular pre-existing solution is associated with an issue is likewise implementation dependent. For example, in (c) above, the pre-existing solutions are linked by pointers to the issues.

Regardless of how implemented and how accessed, the second store may be imported into the first in a number of ways. In one particular embodiment, the entire contents of the second store is imported to the first store by appending the second store's contents to that of the first store. Other embodiments may employ different techniques, such as appending only selected portions of the second store's contents. Where the entire contents of the second store are imported, it may be desirable to organize the contents of the first store after the import. Exemplary maintenance activities include culling duplicate issue entries and grouping newly acquired individual issues into categories.

A Second Embodiment of the Invention

Figure 4:
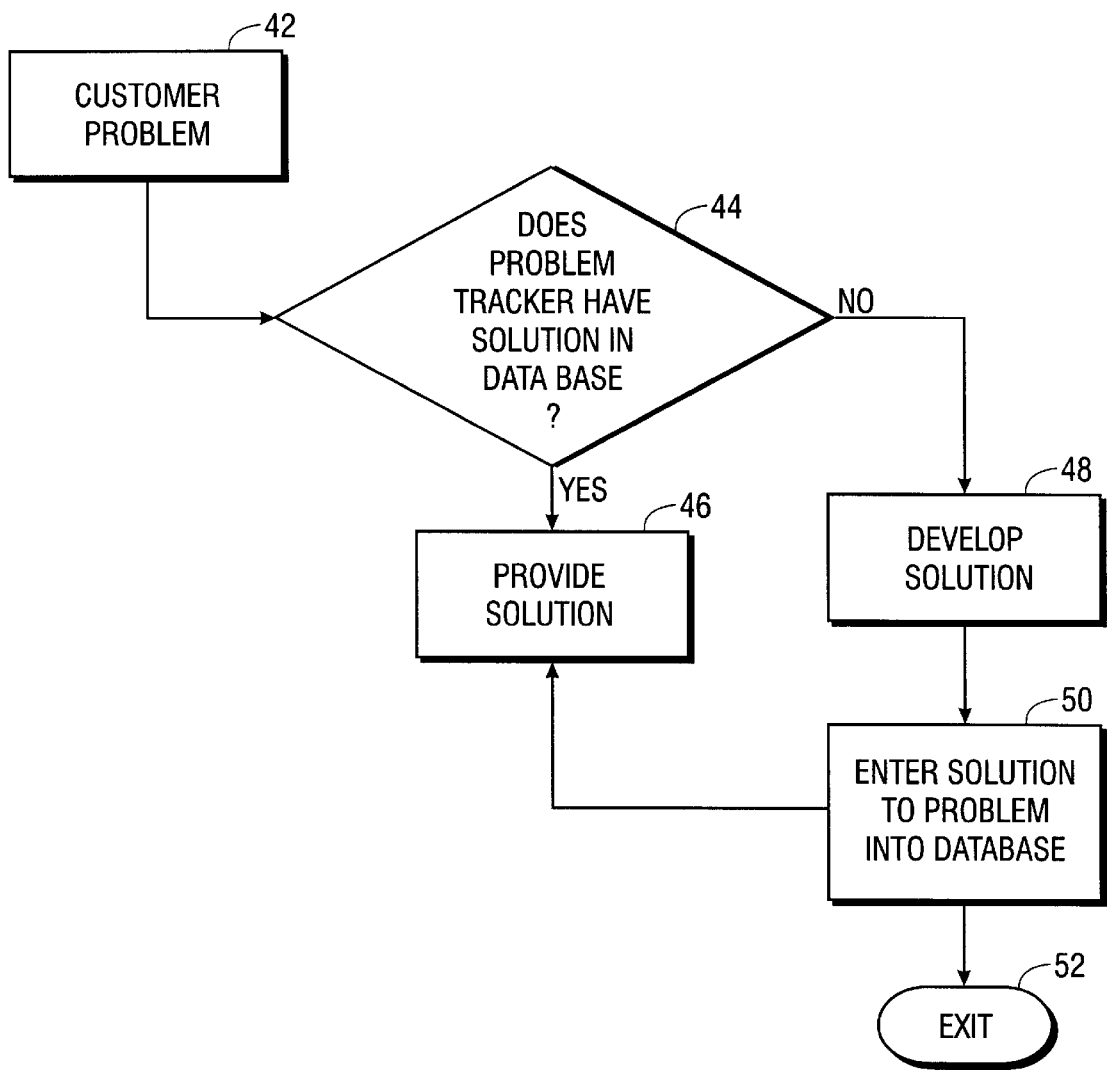
FIG. 4 is a flow chart illustrating a second embodiment in accord with the present invention.

A second embodiment of the invention is set forth in FIG. 4. For illustrative purposes, the following embodiment involves a scenario in which a third party computer owner calls a technical service representative for help with their computer. It should be appreciated by persons of ordinary skill in the relevant arts that the process of the present invention is not dependent on interaction of an outside party. For example, when a new trainee for some company must learn to use a particular program or piece of hardware, the instant invention could be used to resolve most problems that may arise. In other words, the process could be used for other facets, such as, training or file management.

The owner explains the error messages they have received and what they were doing when the error occurred or the characteristics of the problem they are confronting. With this information, the technical service representative can identify the customer's problem. If the solution is not apparent without research, the technical service representative will initiate the "problem tracker" software of the present invention.

The technical service representative or the customer must ascertain what the problem is as set forth in block 42. The technical service representative will be relying on the software implementing the invention to quickly find and answer the question of whether there is a solution in the database as set forth in block 44 of FIG. 2. If the database has an appropriate pre-existing solution to the problem, the software will provide the pre-existing solution to the technical service representative, as set forth in block 46. If the current database does not have the solution, the technical service representative will develop an original solution, as set forth in block 48, by conventional research methods. Once the original solution is discovered, the technical service representative will enter the original solution to the customer problem into the database as set forth in block 50, communicate the original solution to the third party (not shown in FIG. 4), and exit the implementing software as set forth in block 52. Thus, the next third party with a similar question can be helped immediately.

Because the process of developing an original solution may take time to research, the technical service representative may decide to tell the third party caller/owner that they will need to call them back. This may not be necessary if the representative can quickly retrieve the correct pre-existing solution. In such situations, the pre-existing solution may be communicated upon identification. Further, as with the embodiment of FIG. 3A:

(a) The act of ascertaining whether the database includes a solution for the issue may further include identifying a category to which the issue is classed; searching the database to sequentially examine a plurality of possible solutions associated with the category; and selecting the solution that is retrieved from among the plurality of possible solutions.

(b) The act of retrieving a possible solution may include identifying a category to which the issue is classed; searching the database to sequentially examine a plurality of possible solutions associated with the category; and selecting the solution that is retrieved from among the plurality of possible solutions.

(c) The solution, whether pre-existing or original, may be communicated in many ways, including orally or through electronic mail.

(d) The list of potential issues is typically also stored in a separate database although this is not necessary to the practice of the invention since the list could simply be maintained in a text file for display.

A Third Embodiment of the Invention

Figure 5:
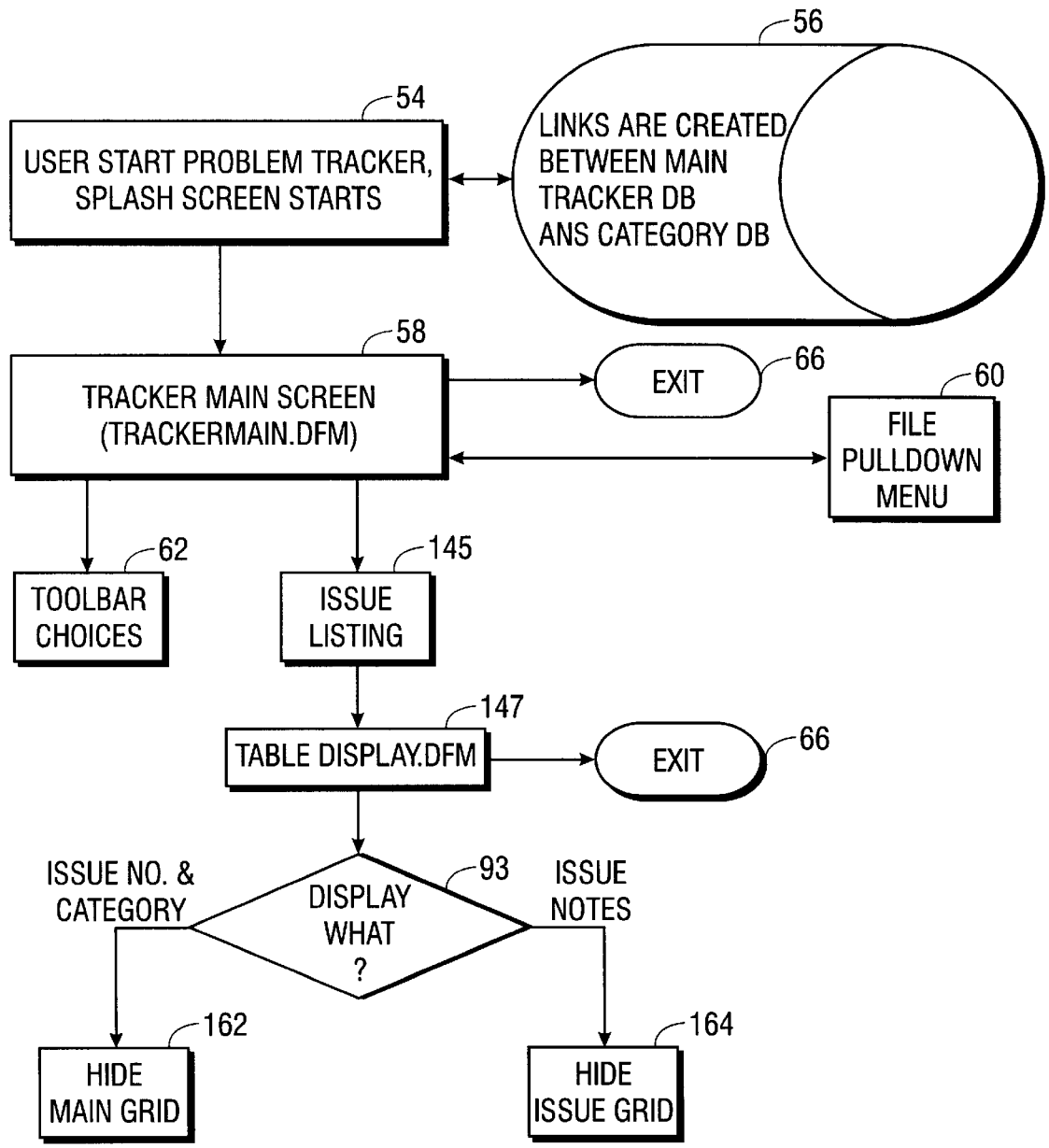
FIG. 5 is a flow chart illustrating a third embodiment in accord with the invention.

In a third embodiment, the computer 10 is equipped with a graphical user interface is ("GUI") operating system to implement one variant of the embodiment in FIG. 4, as shown more particularly in FIG. 5. Exemplary GUI software packages include the commercially available Windows® 95 and Windows® NT operating systems available from Microsoft Corporation of Redmond, Wash. However, it should be understood that the invention can readily be implemented in other GUI software packages and even without a GUI.

The technical service representative can select graphic objects, such as icons, using the mouse 30 of FIGS. 1 and 2 or some other suitable pointing device. The selected graphic object becomes active when the technical service representative, after moving the cursor of the mouse 30 over the graphic object, clicks on the select button of the pointing device (typically, the left mouse button unless changed by the technical service representative). To select a tool represented by a graphic object, the technical service representative moves the cursor over the graphic object and clicks once or twice with the select button on the pointing device. As used herein, a graphic object includes virtually any object that can be graphically displayed for a specific function within a GUI. The definition of a graphic object is intended to encompass, without limitation of other objects, the use of the terms "icon" and "button." The term "icon" is usually related, but not limited, to a graphic object that can initiate a program which could have various graphic buttons. The term "button" typically defines a graphic object that provides the technical service representative with a specific function relative to the icon it is associated with. Many buttons are repeated in various dialog boxes that can only be accessed by an icon.

The technical service representative must first enter information using the implementing software to establish a database although this is not shown in FIG. 5. The database may be of any suitable design known to the art. Preferably, the design is a conventional structure having a file with a collection of records, wherein each record includes one or more fields. In this embodiment, issues are classified into categories and a field in each record contains one category while another field contains one issue. Both the records and fields of the database may be stored sequentially or non-sequentially by conventional methods, e.g., stacks and binary trees. In turn, the same stored database can be sorted and searched by any conventional method, such as alphabetically, numerically or data specific.

Referring now to FIG. 5, to initiate the software implementing the invention the technical service representative will typically double click on a start-up icon within the GUI software. Once the technical service representative or "user starts the problem tracker," i.e., the implementing software, as set forth in block 54, by a conventional means, e.g., clicking on an icon, "links are created between a main tracker database and a category database" as set forth in block 56. The main tracker database "TrackerMain.dfm" provides a list of solutions stored at memory addresses sequentially linked by pointers. The category database "category.db" is a list of topics associated with the various solutions stored at memory addresses which are also sequentially linked. The links created between the main tracker and category databases help to provide searching capabilities discussed below.

Figure 6:
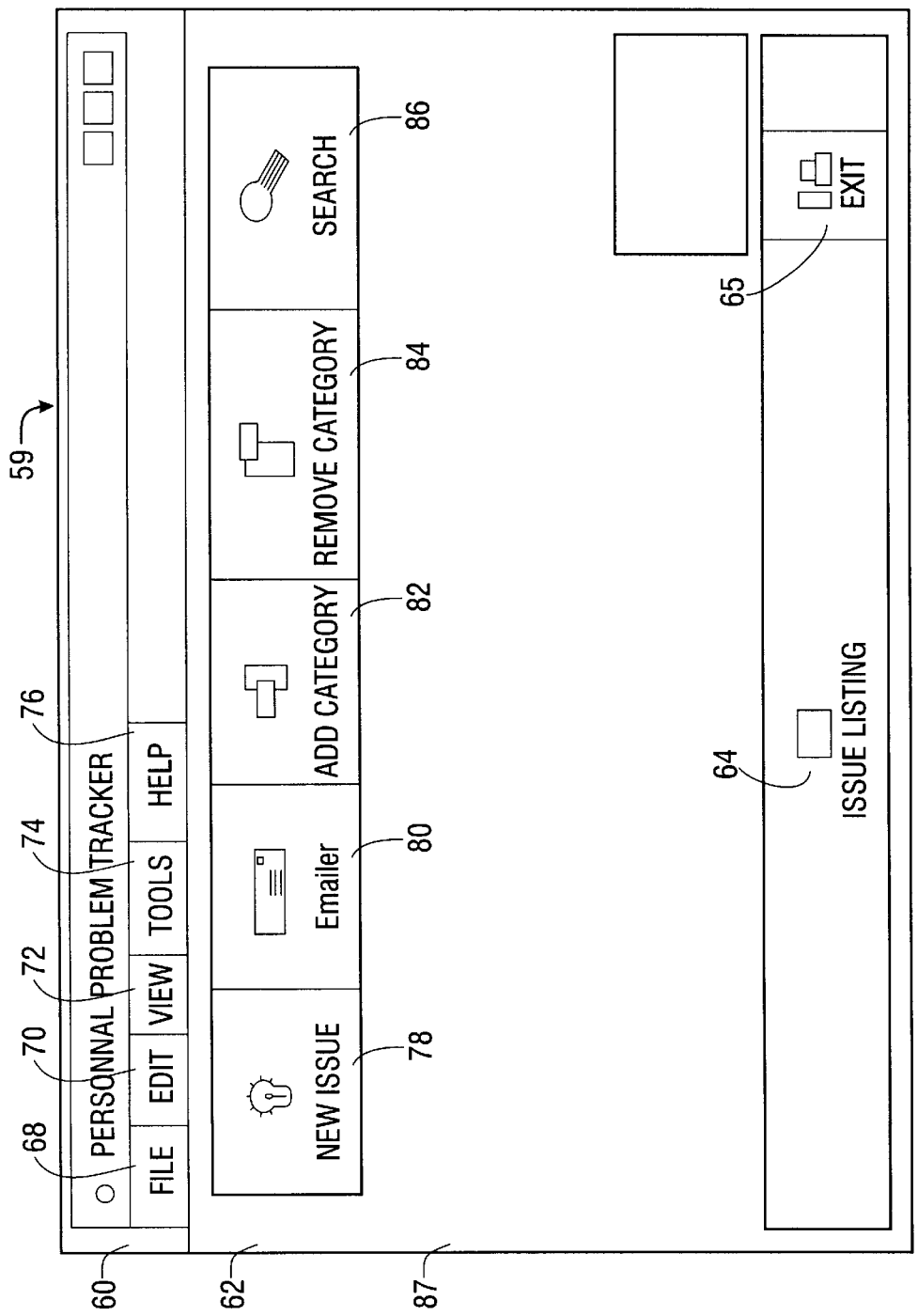
FIG. 6 illustrates a main menu display having a tool bar dialog box as employed in the embodiment of FIG. 5.

The personal computer 10 next displays "tracker main screen" at block 58 for the technical service representative, an example of which is illustrated in FIG. 6. The "Tracker Main Screen," or main menu display, 59 presents the technical service representative with a "File Pull-Down Menu" section 60, a "Toolbar Choices" section 62, an "Issue Listing" section 64, and an "Exit" button 65. More specifically, the "File Pull-Down Menu" section 60 provides a "File" button 68, an "Edit" button 70, a "View" button 72, a "Tools" button 74, and a "Help" button 76. Once a respective button is activated, the appropriate functional options will appear, each having a specific function as will be discussed below. The "Toolbar Choices" section 62 presents a "New Issue" button 78, a "E-Mailer" button 80, an "Add Category" button 82, a "Remove Category" button 84, and a "Search" button 86. And lastly, below an interactive input display window 87, the "Issue Listing" icon 64 is provided for the technical service representative to access the entire problem tracker database by pointing and clicking with a mouse.

Figure 7:
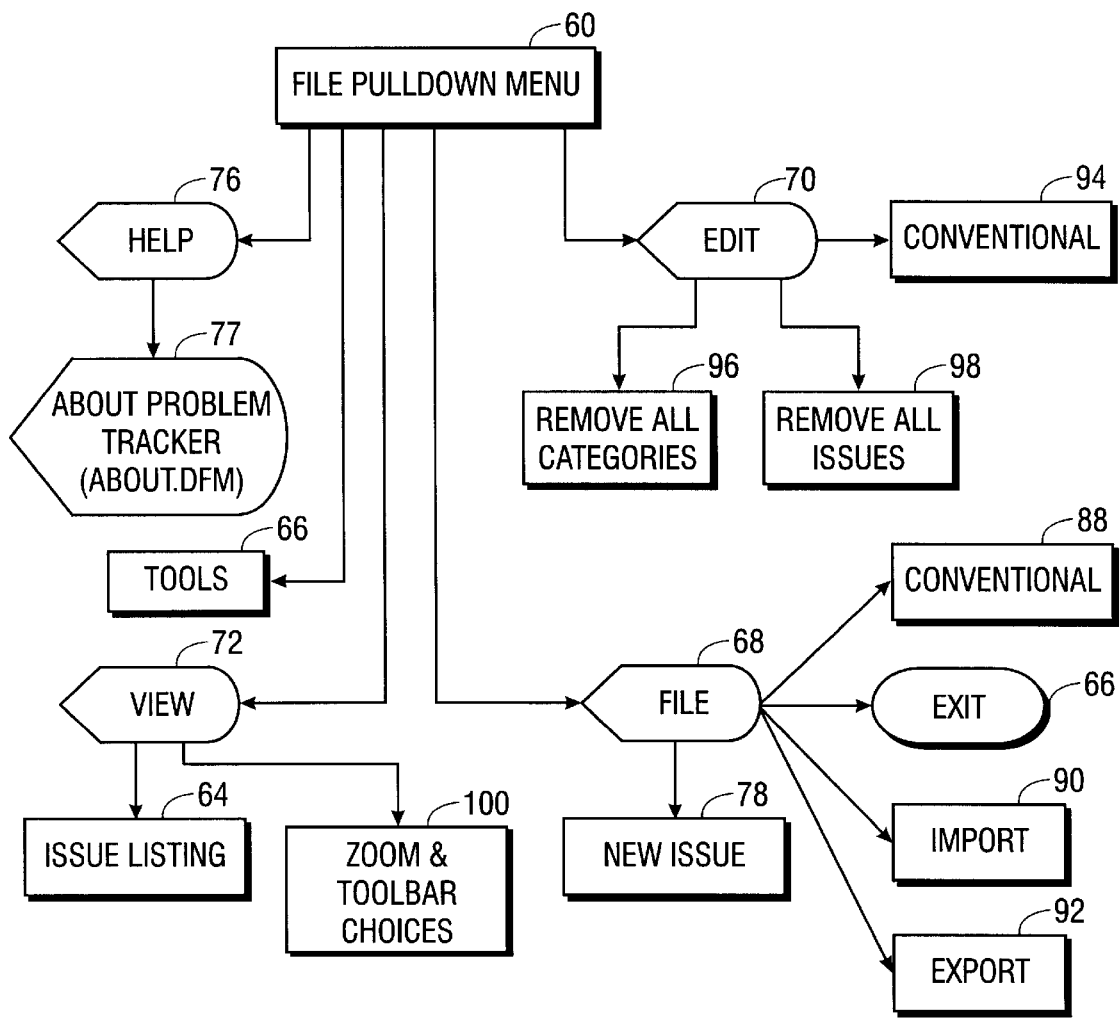
FIG. 7 illustrates a detailed flow chart for the "File Pull-down Menu Options" generally shown in FIG. 5.

File Pull-Down Menu Options. Referring to the flow chart of FIG. 7, the "Pull-Down Menu" function 60 of FIG. 5, will now be described. The Pull-Down Menu function 60 provides the technical service representative with the choices of a "File" menu 68, an "Edit" menu 70, a "View" menu 72, a "Tools" menu, 74, and a "Help" menu 76. Each of these pull down menus allows the technical service representative to choose from typical options associated therewith as well as a few specific options unique to the present invention.

More specifically, with the "File" option 68, the technical service representative is presented with the conventional functions 88 of open, save, save as, close, print, and print setup. Additionally, the "File" menu 68 provides an import function 90 that allows the technical service representative, in embodiments including remote CPUs 35 connected via the LAN 38 or the WAN 40, as shown in FIG. 2, to either access another technical service representative's database or a server type database. Likewise, an "export" function 92, allows the technical service representative to export their database to another technical service representative or a server through the LAN 38 or the WAN 40.

Turning now to the "Edit" option 70, the technical service representative is provided with the conventional options 94 of cut, paste, delete, and font. Additionally, "Edit" option 70 provides the technical service representative with the operation of "Removing all Categories" 96 or "Removing all Issues" 98. Since the database of the present invention is defined by at least one record (Category) having at least one linked field (Issue) to provide a solution, this option will allow the technical service representative to remove all records or fields.

With respect to the "View" option 72, the technical service representative is provided with functions 100, such as, zoom and toolbar, and the "Issue Listing" 64 option, as will be described in further detail with reference to the toolbar choices 62 in FIG. 8. The zoom option allows the technical service representative to increase the size of the text in the window dialog boxes. The toolbar option will provide a dialog box allowing the technical service representative to choose which graphic objects should be displayed in the main menu display 59.

Lastly, the technical service representative can access a "Help" menu 76. The "Help" menu provides the technical service representative with a dialog box 77 which displays who the technical service representative should contact if they have any questions about the software.

Toolbar Choices. Referring now to FIG. 8, the functionality of the "Toolbar Choices" section 62 of FIG. 6 will be described. Graphic objects provide shortcuts to allow functions such as the entry of a "New Issue" 78, an "E-Mailer" 80, an "Add Category" 82, a "Remove Category" 84, and a "Search" 86 function. It will be appreciated by persons of ordinary skill in the relevant arts that the graphic objects of the present invention are similar to icons as defined above and will have at least a one dimensional appearance. Additionally, these icons can be moved to various locations within the software display or their appearance altered by the technical service representative, if desired, via other software.

Each icon and their respective functionality will now be described below with reference to the flow chart of FIG. 8 and the dialog box displays of FIGS. 9-13. Note that the various toolbar choices are typically presented with each window, although one or more might be disabled by the computer 10 from time to time.

New Issue Entry. Referring now to FIGS. 8 and 9, when the "New Issue" function 78 of FIG. 8 is activated, a new issue dialog box 102 shown in FIG. 9 appears in the interactive input display window 87 in conjunction with a category window 104, a "Save" button 106, and a "Cancel" button 108. Additionally, the "Add Category" icon 82 changes to a light shadow-type text indicating that it cannot currently be activated, and the "Remove Category" icon 84 changes to a dark text indicating that it can be activated.

Figure 10:
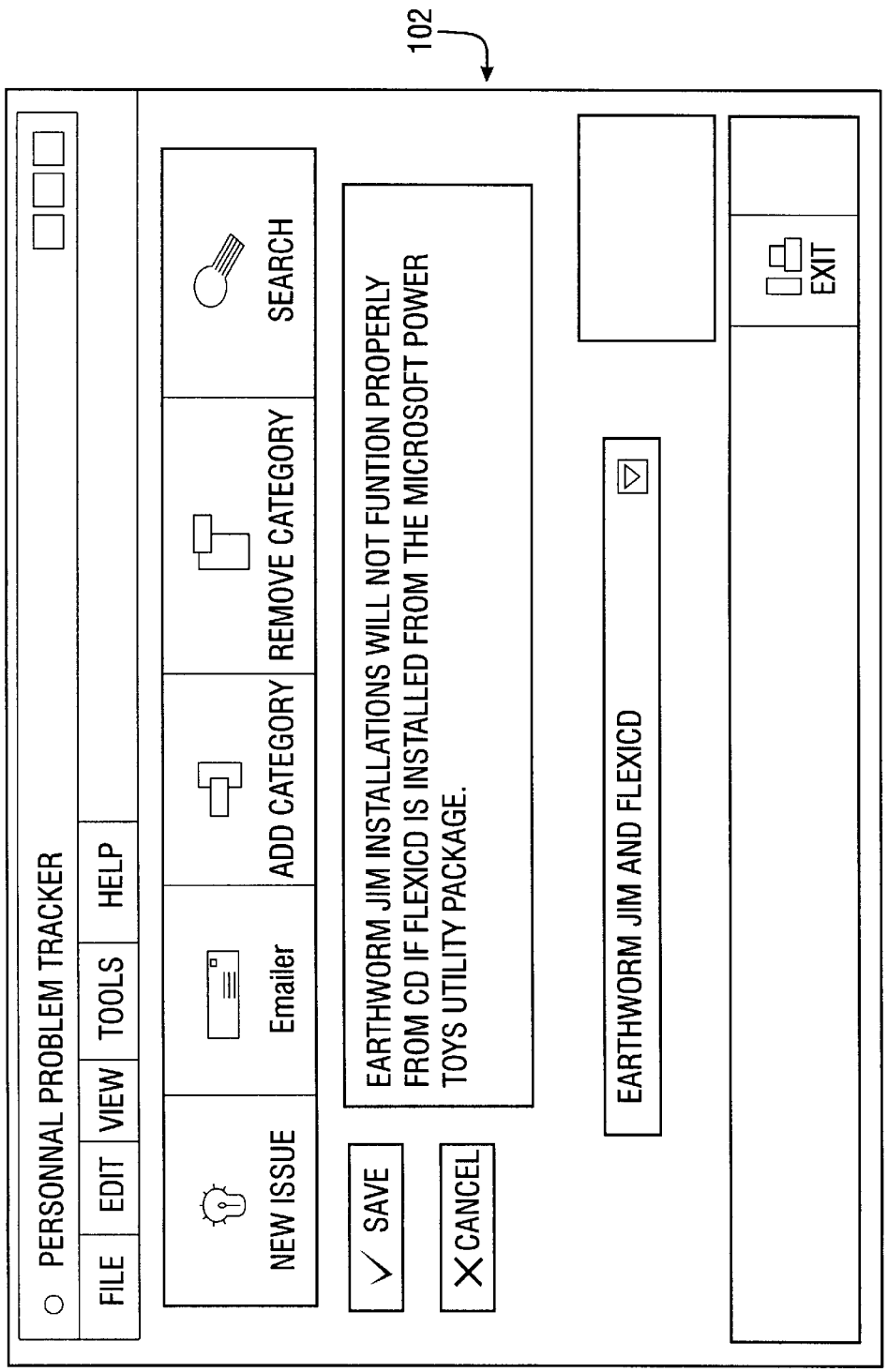

The single line input window 110 allows the technical service representative to enter a solution or new issue which is related to a pre-established category selected from the category window 104. Typically, the category selected by the technical service representative was established from an earlier new issue entry. Once the category has been selected and the solution entered as illustrated in FIG. 10, the technical service representative will activate the "Save" button 106 to store the new issue. Referring now to FIG. 8, once the decision has been made to save at block 109, the computer 10 stores the new issue in the database 112 and returns control to the main menu display 59 of FIG. 6. The technical service representative may then choose from among the toolbar choices as shown in block 62 of FIG. 8. The new issue is stored in a stack memory address location associated with other issues and the necessary links are created within and between the solution and related category memory fields of the database 112. These links can be created by a method known to persons of ordinary skill in the relevant arts by method such as pointers.

If the technical service representative cannot find the appropriate category, the technical service representative will activate the "Cancel" button 108 shown in FIGS. 9–10. Once the decision has been made to cancel at block 109 of FIG. 8, the computer 10 will delete any inserted data into the input window 110 and close the new issue dialog box 102, thereby presenting the main menu display 59 of FIG. 6. The technical service representative may then again choose from among the toolbar choices as shown in block 62 of FIG. 8. The "Cancel" button 108 will close the new issue dialog box 102 thereby presenting the main menu display 59 of FIG. 6, and delete any inserted data into the input window 1 10. In turn, the "Add Category" icon 82 will change back to a dark text thereby indicating that it can be activated by the technical service representative.

Adding and Removing a Category. By activating the "Add Category" icon 82 as shown in block 114 of FIG. 8, a single line entry display similar to the dialog display of FIG. 9 for a search will be displayed. However, instead of a "Search" button, an "Add" button would be displayed. To add the desired category, the technical service representative will enter the category by conventional input means such as a keyboard, and activate the "Add" button. The new category is saved to memory and linked to the existing category record of the problem tracker database 93. Similarly, the technical service representative can remove a category as shown in block 117 of FIG. 8 by activating the "Remove Category" button 84 shown in FIG. 6. Of course, if the technical service representative changes his mind, he can always abort the process of adding or removing a category by activating the "Cancel" button to return to the main menu display 59. Again, any entry within the single line entry display will be deleted when the "Cancel" button is activated.

Figure 11:
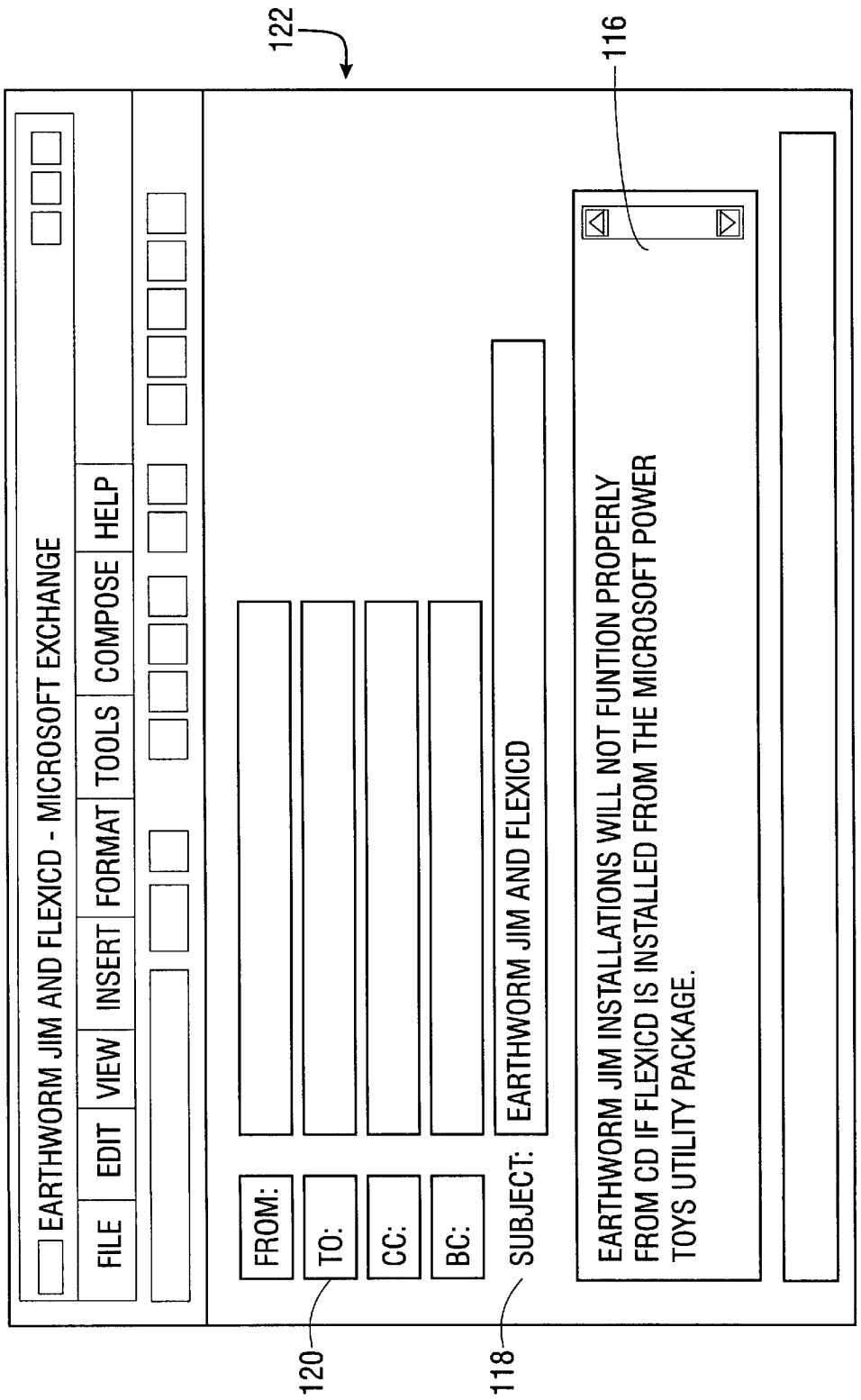
FIG. 11 illustrates a typical e-mail display utilizing the new issue text entered in FIG. 10, after the "E-Mailer" graphic object of the toolbar has been activated.

E-Mail Solution. Before canceling the new issue display, the technical service representative may decide that the newly entered issue would be useful to a co-worker in an e-mail message as set forth in block 115 of FIG. 8. By activating the "E-Mailer" icon 80, the technical service representative's e-mail software will initiate as illustrated in FIG. 11. Once initiated, the solution and category data of the issue display window 102 in FIG. 9 will be transferred into the input window 116 and the subject window 118, respectively, of the e-mail dialog box 122. Consequently, the technical service representative need only designate the appropriate e-mail address for the co-worker into the "To" field 120 of the e-mail display 122 to communicate the solution to the customer.

In this particular embodiment, the e-mail message is transmitted from an e-mail package implementing a Messaging Application Programming Interface ("MAPI"). The customer must therefore also employ a MAPI-enabled e-mail package for e-mail communication to occur. Exemplary MAPI-enabled e-mail packages include those implemented with MAPI 32 under Windows® 95, Windows® OSR 2, Windows® NT 4.0, and Windows® NT 3.51 operating systems. However, not all embodiments must necessarily employ MAPI e-mail packages so long as the package used by the technical service representative and the customer are compatible.

It should be appreciated by persons of ordinary skill in the relevant arts that the manipulation of the issue and category data from the new issue display 102 can be transferred into any e-mail field. Additionally, this process of transferring data could be specific to any software program or network type of memory if desired by the technical service representative. For example, if the technical service representative wants to manipulate the data in a spreadsheet type of software package, the "E-Mailer" icon 80 could be a specific link to the spreadsheet software. In turn, if the technical service representative is connected to a plurality of technical service representatives through a peer-to-peer or client/server computer architecture, the "E-Mailer" icon 80 could activate the transferring of the solution and category data to the appropriate network hard disk for the plurality of technical service representatives to access.

The technical service representative can also use the "E-Mailer" icon 80 directly from the main menu display 59 of FIG. 6. Upon activation of the "E-Mailer" icon 80, the associate e-mail program software will be initiated. However, since no information has previously been established in another function of the instant invention, only the e-mail software start-up dialog box will appear. Consequently, if the technical service representative wants to transfer a specific information from the software implementing the invention, they must use conventional cut and paste commands between the two software programs. In the instant invention, the desired database information can be copied from any display window which will provide the information, such as, the search or issue listing display window which will be discussed below.

Search Database. From the main menu display 59 of FIG. 6, the technical service representative can search the problem tracker database for a solution to the customer problem as is shown in FIG. 8 at block 125. The "Search" icon 86, once activated, displays a single line input display 124 as illustrated in FIG. 12. With this input display, the technical service representative can enter a problem identifier into the search input field 126. The problem identifier will typically contain at least one key word or number that is directly associated to the customer problem. Upon the activation of the "Search" button 128, the software implementing the invention searches the database, category records and fields, until a match is found or the database is exhausted. The technical service representative is aware that the search is in progress because the "Search" button 128 changes from a dark to a light shadow-type text indicating that it cannot be activated. If there is no match, the "Search" button 128 will change back to the dark text and allow the technical service representative to enter a new problem identifier into the single line input window 126.

Figure 8:
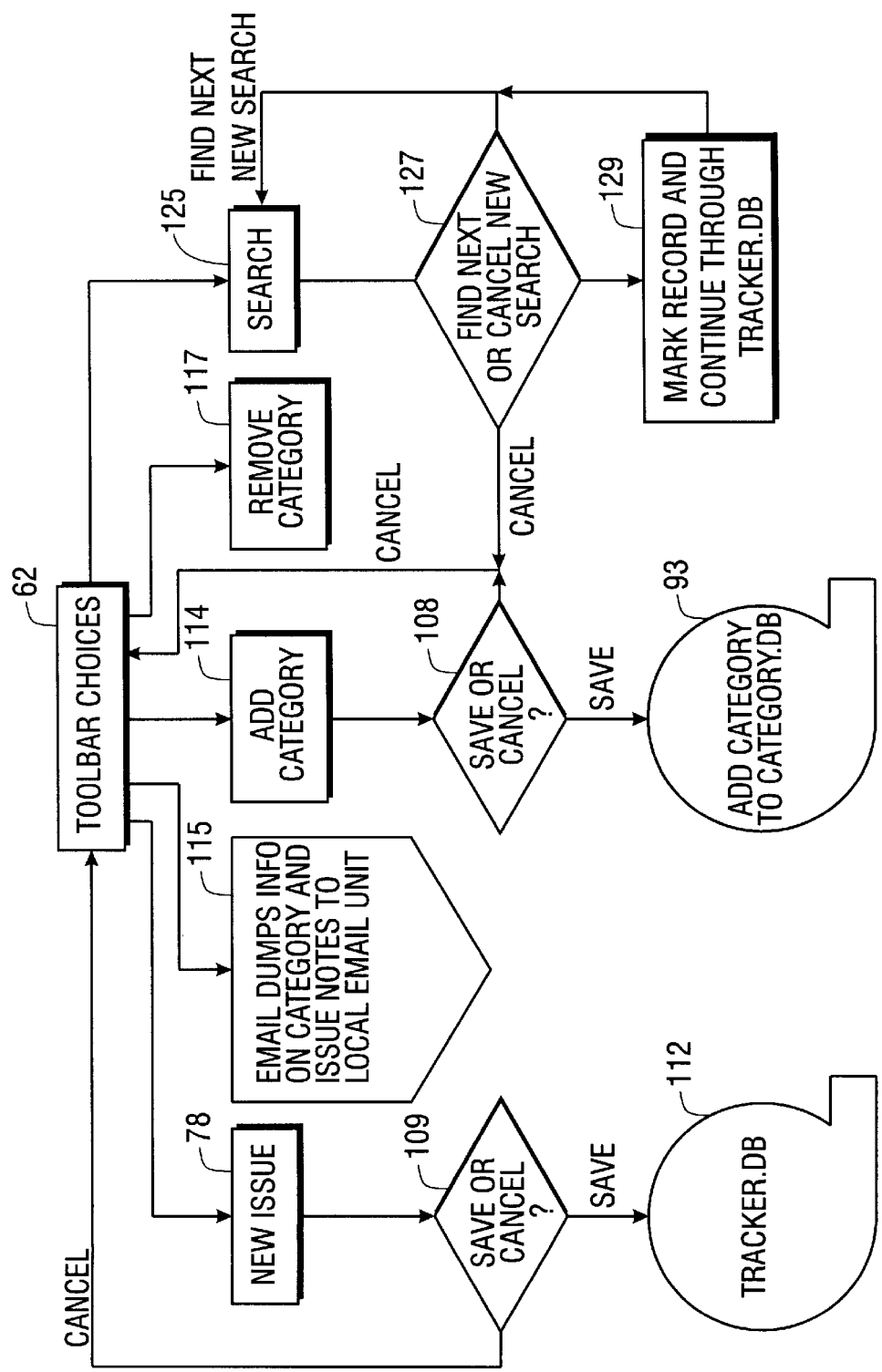
FIG. 8 illustrates a detailed flow chart for the "Toolbar Choices" option generally shown in FIG. 5.
Figure 9:
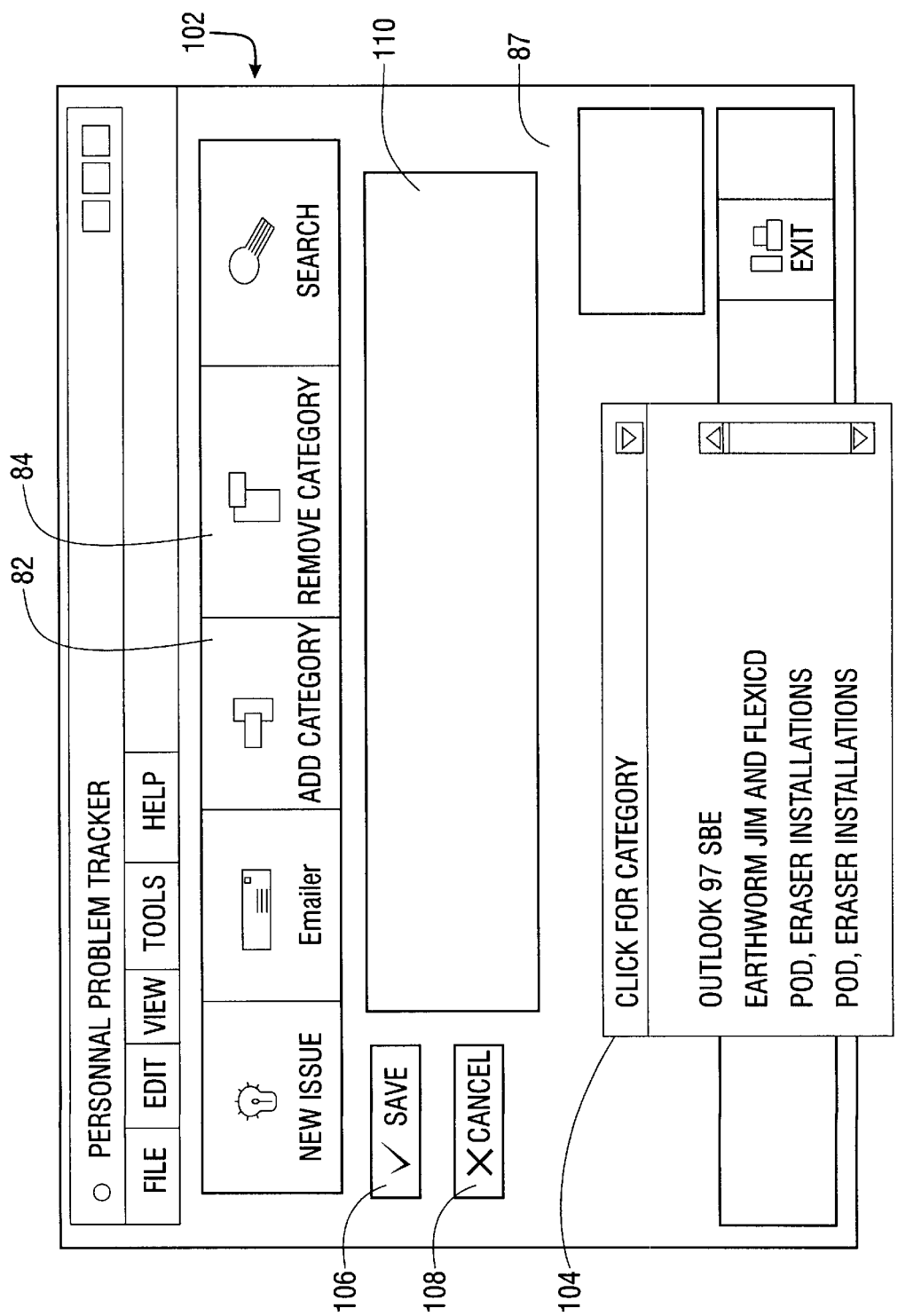
FIGS. 9 and 10 illustrate the dialog box associated with the "New Issue" graphic object of FIG. 8, before and after the new issue is entered, respectively.

With reference to the flow chart of FIG. 8, the records of the database are searched as set forth at block 125 until a single result is found. The technical service representative is then presented with the option buttons of "Cancel" 130, "New Search" 132 or "Find Next" 134 as indicated by the block 127 of FIG. 8. If the current result is not the desired solution, the technical service representative can continue to sequentially search the database as many times as necessary from where the last result was found by activating the "Find Next" button 134 until the desired result is found, or until the database is exhausted as shown in FIG. 8. Each time a result is found it is displayed to the technical service representative as illustrated in FIG. 13. If the result is a potential solution, the technical service representative marks the solution for later retrieval as indicated in block 129 and then finds the next possible solutions, starts a new search or cancels the search. The technical service representatives at any time during the search can change the search problem identifier to start a new search in the database or cancel the search process by activating the "New Search" button 132 or the "Cancel" button 130, respectively.

Referring now to the specific example of FIG. 13, the first result found for the associated problem identifier, activates the display of the results window 136. The results window 136 provides the technical service representative with the "New Search" and "Find Next" buttons 132, 134, and an "Issue No." column 138, a "Category" column 142, and a "Solution" window 144 for displaying the results of the search. As indicated, the first search result is the lower of two entries, and displays a "38" in the "Issue No." column 138. The problem identifier for the search was "BT930 and Lighting" as indicated by in the "Category" column 142. The "Issue No." column 138 also displays a "42" entry which was the first result after the activation of the "New Search" button 132. In this search, the technical service representative entered the problem identifier of "Bookshelf Basics 97 Office Pro," which as indicated in the "Category" column 142 was a category record of the database. The solution for any result found can be displayed to the technical service representative in the solution window 144 by highlighting the respective "Issue No." For this specific example, the solution window 144 displays the solution for the highlighted "Issue No." "38."

As indicated above, for this embodiment, each search is performed by sequentially searching the problem tracker database until the problem identifier for the respective search is found. Once one result is found, the technical service representative either continues the search by activating the "Find Next" button 134 or starts a new search from the beginning of the database by activating the "New Search" button 132 after entering a new problem identifier. With either type of search, the number indicated in the "Issue No." column 138 tells the technical service representative where the result can be found in the database list. For instance, since the search for "BT930 and Lighting" produced a "38" in the "Issue No." column 138, the technical service representative knows that the result is the thirty-eighth issue listing for the problem tracker database having at least "44" entries. Thus, the technical service representative quickly decides how old or new the solution is and how to proceed with the search.

All new searches of the database start from the most recently entered new issue and, if necessary, end at the first new issue entered, at which time the database has been exhausted. In other words, the database is organized in a last in first out stack. Thus, for any new search, the first issue that will be reviewed by the search will be the most recent new issue entered. As the technical service representative continues to activate the "Find Next" button 134, assuming an issue is found before the database is exhausted, the search will continue from where it found the last solution to the problem identifier, without repetition, until the database is exhausted. If the "New Search" button is activated at any time during a current search, the search for the problem identifier of the new search will start from the top of the stack, most recently entered new issue, and move through the database marking and searching until the database is exhausted or the "New Search" 132 or "Cancel" button 130 is activated.

It should be appreciated by persons of ordinary skill in the relevant arts that the instant invention is not limited to a sequential searching technique of the database. Depending on how the database is configured, it would be conceivable that any conventional technique could be used which would most effectively sort and find the appropriate problem identifier. Additionally, if desirable, other fields such as time and size of a file or other associated information, could be displayed for the results of a search.

Figure 14:
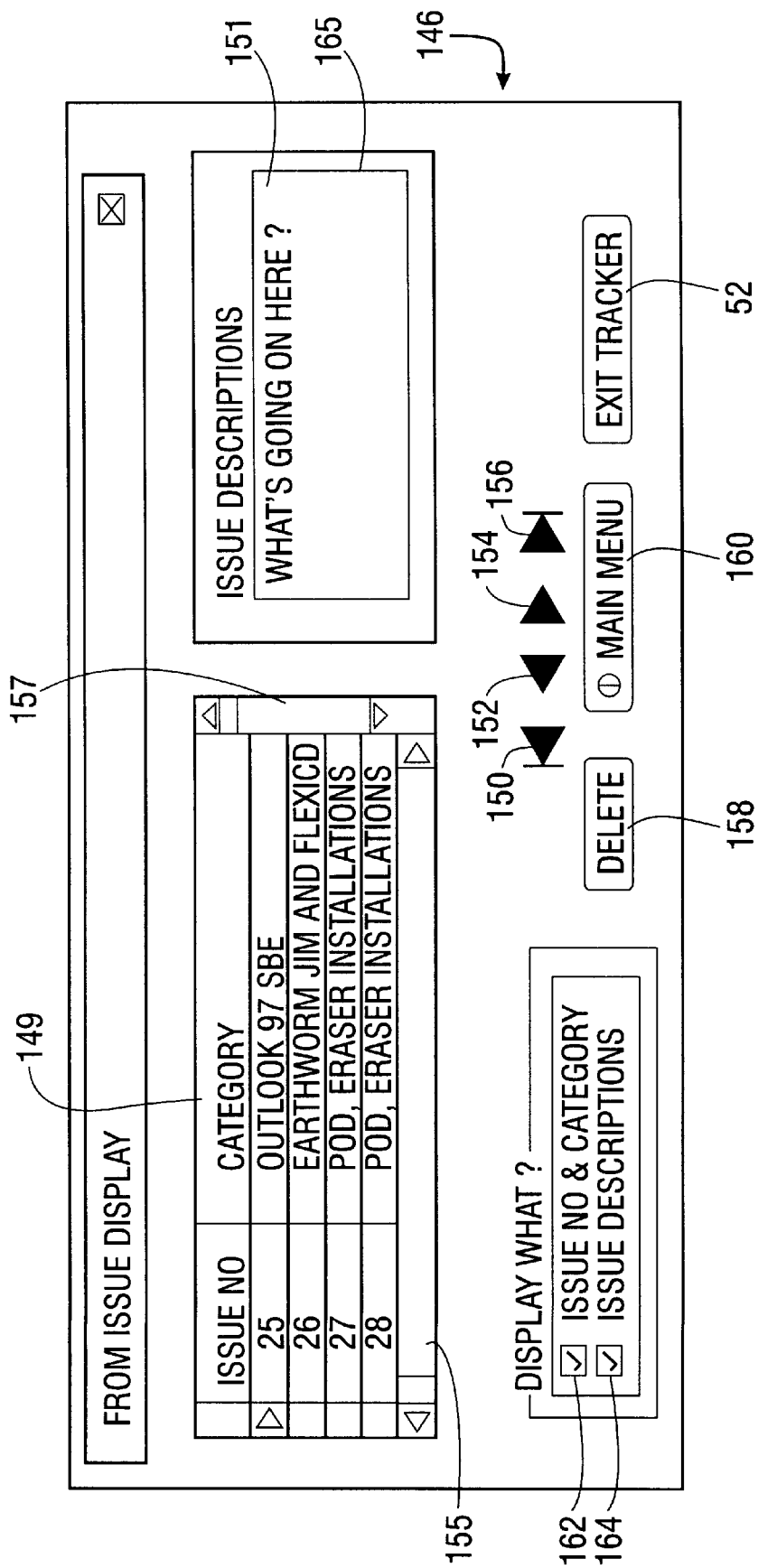
FIG. 14 illustrates the "frmIssueDisplay" dialog box after the activation of the "Issue Listing" graphic object of FIG. 6.

Issue Listing. Referring once again to FIG. 5, the functional operation of the "Issue Listing" icon 64 is shown in the form of a flow chart. As will be described in more detail below, the "Issue Listing" icon 64 can be used as a quick review of all solutions and their related categories of the database or possibly just for purposes of database management. When activated from either the file pull-down options 60, main menu display 59, or the toolbar choices 62 as shown at block 145 of FIG. 5, a "frmIssueDisplay" dialog box 146 illustrated in FIG. 14 is presented to the technical service representative as also shown in FIG. 5 at block 147. The "frmIssueDisplay" dialog box 146 provides a similar "Issue No." column 148, "Category" column 149, and "Issue Description" window 151 as displayed by the search results display of FIG. 13. However, the technical service representative is also provided with a "Display What?" window 153; first 150, previous 152, next 154, and last 156 buttons; and "Delete" 158, "Main Menu" 160, and "Exit Tracker" 52 buttons.

The "Display What" window 153 allows the technical service representative to choose whether the display of the "Issue No & Category" 162 or the "Issue Description" 164 or both would be most beneficial for reviewing the database results. The technical service representative can scan through the various issue numbers, categories, and specific solutions by using the first, previous, next, and last icons 150, 152, 154, and 156. Similarly, the technical service representative can scroll through the list with the horizontal or vertical scroll buttons 155 and 157 by clicking the cursor of a mouse button over the desired scroll button. However, to view a specific issue description 151 when using the scroll buttons, the technical service representative will need to highlight the respective issue number before it will appear in the issue description window 165.

If the technical service representative wants to manage the database as they review the issue listing, they can always activate the "Delete" button 158 when the desired issue number is highlighted. In turn, if the technical service representative has exhausted the list and wants to return to the main menu or even exit the program all together, they can activate the "Main Menu" button 160 or the "Exit Tracker" button 52, respectively.

Because it may not always be efficient for the technical service representative to manage the database by activating the "Issue Listing" button 64, the technical service representative may decide to manage the database from the various other means listed above. For example, if the technical service representative is at the main menu display 59 of FIG. 6, the "Add Category" icon 82 can be activated to Add a single category. In turn, if the technical service representative is in the new issue display window 102 of FIG. 9, the "Remove Category" icon 84 may be used to remove a single category. Unlike the "Edit" functions 70 of the file pull-down menu options 60 of FIG. 7 where all categories or issues can be removed with a simple mouse click, the above icon allow the technical service representative to add or remove a single category at a time.

Database Management. This particular embodiment also manifests several database management features greatly facilitating the technical service representative's performance. The features enable the customer service representative to customize the database to reflect personal experience with the type of issues they are asked to resolve. Each of these features was mentioned above, but is set forth here to clarify their interaction and the advantages accruing from their use.

The first feature is the ability to manage individual issues in the particular database in use. This feature revolves around the ability to add and delete issues and to add and delete issues that are categories of related issues as discussed above. This feature therefore permits record-by-record maintenance of the existing database contents.

The second feature is the ability to access the databases of other technical service representatives. Referring now to FIGS. 2 and 3A, in this particular embodiment the technical service representative's computer 10 interfaces with the LAN 38 or the WAN 40, each of which includes at least one remote CPU 35. Each remote CPU 35 has associated therewith one of more memory devices such as the floppy disk 18, CD-ROM 16, hard disk 14, and/or memory 36 associated with the CPU 34. The memory associated with each remote CPU 35 will contain a database such as the "TrackerMain.dfm" database of the computer 10. The CPU 34 and each remote CPU 35 is programmed to access the database associated with each of the other CPUs such that any technical service representative can access the database of any other technical service representative on the LAN 38 or the WAN 40.

The third feature, database import/export, allows a technical service representative to import the database of another technical service representative. The import is performed by accessing the other technical service representative's database over the LAN 38 or the WAN 40 as described above and appending the records therein to the technical service representative's own database. In this particular embodiment, the entire contents of the imported database are appended on a record-by-record basis although, in other embodiments, only selected records might be imported. Once the records are imported, the technical service representative can then organize the database using the first feature set forth above.

Remarks

With the system described above, the technical service representative is able to maintain a personalized pool of information tailored to his specific needs and yet is still able to tap the resources of other technical service representatives. Because of the manner in which the information may be imported, the technical service representative is able to categorize and filter the imported issues to maintain the personalized nature of the information. The software of the present invention, unlike conventional discussed above, only occupies a fraction of the memory space. Consequently, when the software implementing the invention is loaded and running, it does not slow down the advisors system. Additionally, as mentioned above, if a group of technical service representatives are connected through a WAN or LAN interface, the pool of information can grow to accommodate the growth of solutions and related problems of computer technical service representatives and owners. Other advantages may be apparent from the discussion above. For instance, the invention permits technical service representatives to keep valuable information about tough technical issues in one place and includes search capabilities for accessing a group of topics quickly. Some embodiments also permit the technical service representative to exchange information with others either by electronically mailing information or by importing/exporting whole databases.

Thus, the invention in its various embodiments addresses many problems found in the prior art. The particular embodiments disclosed above, however, are illustrative only as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, executed by a machine as part of a help-desk system operated by a customer service representative, of searching for a solution to a problem statement posed by a customer, the method comprising:

(a) receiving from the customer service representative an input signal encoding a representation of the customer problem statement;

(b) retrieving, from a first store co-located with the machine, and displaying to the customer service representative, a first list of problem statements potentially matching the customer problem statement;

(c) receiving from the customer service representative an input signal requesting that additional problem statements be displayed;

(d) retrieving over a network, from a second store remote from the machine, and displaying to the customer service representative, a second list of problem statements potentially matching the customer problem statement;

(e) receiving from the customer service representative an input signal designating a specific problem statement from the second list of problem statements, referred to as a selected problem statement; and (f) displaying to the customer service representative the solution stored in the second store and associated with the selected problem statement.

2. The method of claim 1, wherein at least one of the first store and the second store comprise a database including a plurality of records, each record containing a problem statement and at least one pre-existing solution to the problem statement.

3. The method of claim 1, wherein at least one of the first store and the second store comprise:
a first database including a first plurality of pre-existing solutions; and
a second database including a second plurality of solutions, each of the first and second plurality of solutions being associated with at least one of the plurality of problem statements.

4. The method of claim 1, wherein at least one of the first store and the second store comprise:
a list if problem statements; and
a list of pre-existing solutions, each one of the pre-existing solutions being linked to at least one of the problem statements.

5. The method of claim 1, wherein at least one of the first store and the second store comprises:
a list of pre-existing solutions; and
a file containing at least one problem statement and a pointer associated with the at least one problem statement, the pointer pointing to a particular pre-existing solution.

6. The method of claim 1, wherein the network comprises at least one of a LAN and a WAN.

7. The method of claim 1, wherein the act of retreiving is through a server.

8. The method of claim 1, further comprising generating the second store by:
receiving from the customer service representative an input signal encoding a representation of the solution to the customer problem statement; and
storing the customer problem statement and the solution into the second store.

9. A method, executed by a machine as part of a help-desk system, operated by a customer service representative, of searching for a solution to a problem statement posed by a customer, the method comprising:

(a) receiving from the customer service representative an input signal encoding a representation of the customer problem statement;

(b) retrieving, from a first store co-located with the machine, and displaying to the customer service representative, a first list of problem statements potentially matching the customer problem statement;

(c) receiving from the customer service representative an input signal requesting that additional problem statements be displayed;

(d) identifying a second store remote from the first store, the second store containing at least one problem statement and at least one pre-existing solution associated with the at least one problem statement;

(e) importing the second store into the first store over a network;

(f) retrieving from the first store, and displaying to the customer service representative, a second list of problem statements potentially matching the customer problem statement;

(g) receiving from the customer service representative an input signal designating a specific problem statement from the second list of problem statements, referred to as a selected problem statement; and (h) displaying to the customer service representative the solution stored in the first store and associated with the selected problem statement.

10. The method of claim 9, wherein importing the second store into the first store includes appending at least one problem statement and an associated pre-existing solution into the contents of the first store.

11. The method of claim 10, further comprising organizing the contents of the first store after the second store is imported.

12. The method of claim 9, wherein at least one of the first store and the second store comprise a database including a plurality of records, each record containing an problem statement and at least one pre-existing solution to the problem statement.

13. The method of claim 9, wherein at least one of the first store and the second store comprise:
a first database including a first plurality of pre-existing solutions; and
a second database including a second plurality of solutions, each of the first and second plurality of solutions being associated with at least one problem statement.

14. The method of claim 9, wherein at least one of the first store and the second store comprise:
a list of problem statements; and
a list of pre-existing solutions, each one of the pre-existing solutions being linked to at least one of the problem statements.

15. The method of claim 9, wherein at least one of the first store and the second store comprise:
a list of pre-existing solutions; and
a file containing at least one problem statement and a pointer associated with the at least one problem statement, the pointer pointing to a particular pre-existing solution.

16. The method of claim 9, further comprising:
retrieving a category comprising the second list of problem statements; and
displaying to the customer service representative the category stored in the first store.

17. The method of claim 9, wherein the network comprises a at least one of a LAN and a WAN.

18. The method of claim 9, wherein the act of retrieving is through a server.

19. The method of claim 9, wherein the entire second store is imported into the first store.

20. The method of claim 9, wherein importing the second store into the first store includes appending at least one problem statement and an associated pre-existing solution into the contents of the first store.

21. The method of claim 9, further comprising organizing the contents of the first store after the second store is imported.

* * * * *